United States Patent Office 3,746,639
Patented July 17, 1973

---

3,746,639
PHENOL PLANT EFFLUENT TREATMENT
Thomas Bewley, Epsom, and Maurice Dudley Cooke, East Horsley, England, and Max Marin Wirth, Culross, Scotland, assignors to BP Chemicals Limited, London, England
No Drawing. Filed June 25, 1971, Ser. No. 156,875
Claims priority, application Great Britain, July 6, 1970, 32,636/70
Int. Cl. C02c 5/02
U.S. Cl. 210—18     5 Claims

ABSTRACT OF THE DISCLOSURE

A process for improving the biodegradability of a phenol plant effluent stream by decomposing or chemically modifying certain biocides contained therein.

---

The present invention relates to a process for the biodegradation of a phenol plant aqueous effluent stream.

For the purpose of this invention phenol plant is defined as a plant in which phenol is produced by the oxidation of cumene followed by decomposition of the oxidation product, cumene hydroperoxide, to phenol and acetone.

Effluent streams from phenol plants normally contain water, traces of phenol and acetone and other impurities. Such effluent streams give very low results when tested for biological oxygen demand (BOD) despite their high chemical oxygen demand (COD). It is believed that this is due to the presence of certain biocides, other than phenol itself which sterilise the microorganism responsible for biodegradation in, for example, the standard BOD determination. It is very desirable that the effluent stream from a phenol plant should be biodegradable.

An improved biodegradation process has now been discovered in which certain biocides present in the effluent stream are removed prior to biodegradation.

Thus according to the present invention there is provided a process for the biodegration of a phenol plant effluent stream which process comprises treating the phenol plant effluent stream with sulphur dioxide or a sulphur-containing compound prior to contacting the effluent with an activated sludge biodegration unit.

Suitable sulphur-containing compounds include soluble metal sulphites, bisulphites and metal sulphides. The preferred compounds are sodium sulphite, sodium bisulphite and sodium sulphide.

Treatment of the effluent with sulphur dioxide necessitates the addition of further alkali to neutralise the free acid remaining after partial neutralisation by sodium carbonate contained in the effluent stream. Removal of biocides from the effluent stream by treatment with sulphur-containing compounds such as sodium sulphite, sodium bisulphite or sodium sulphide is thus preferred because further addition of alkali is avoided. A convenient source of caustic sulphided liquor is the effluent stream from an ethylene cracking unit. A suitable source of sodium bisulphite liquor may be, for example, paper mill waste streams.

It is believed that the treatment with sulphur dioxide or the sulphur-containing compound decomposes or chemically modifies the biocides present in the effluent stream, thereby facilitating its biodegradation.

The invention is illustrated by the following example:

EXAMPLE

The chemical oxygen demand (COD) and the biological oxygen demand (BOD) of a sample of a phenol plant effluent were measured before and after treatment of the effluent with 0.4% of sulphur dioxide, a quantity such that no excess sulphite ion could be detected after treatment. The results were as follows:

|  | COD | BOD |
|---|---|---|
| Before $SO_2$ treatment | 13,850 | <1 |
| After $SO_2$ treatment | 13,850 | 700 |

Following the treatment with sulphur dioxide the effluent stream was contacted with activated sludge, slurried and allowed to settle.

The example shows that treatment with sulphur dioxide greatly increased the test result for BOD, that is to say the biodegradability of the effluent stream.

We claim:
1. A process for the treatment of a phenol plant effluent stream to facilitate biodegradation thereof which comprises treating the phenol plant effluent stream containing water, phenol, acetone and other impurities with sulphur dioxide, or a soluble metal sulphite, bisulphite, or sulphide.
2. A process as claimed in claim 1 wherein the compound is selected from sodium sulphite, sodium bisulphite and sodium sulphide.
3. A process as claimed in claim 1 wherein the phenol plant effluent stream is treated with the sulphided effluent stream from an ethylene cracking unit.
4. A process as claimed in claim 1 wherein the phenol plant effluent stream is treated with a paper mill waste stream.
5. A process for the biodegradation of a phenol plant effluent stream which comprises treating the phenol plant effluent stream containing water, phenol, acetone and other impurities, with sulphur dioxide, or a soluble metal sulphite, bisulphite, or sulphide, and then contacting said effluent with an activated sludge biodegradation unit.

References Cited
UNITED STATES PATENTS
2,877,177   3/1959   Story _____'_____ 210—50 X
3,278,423   10/1966  Millar _____ 210—15 X

OTHER REFERENCES

Colour Index, Soc. of Dyers and Colourists, first edit, January 1924, p. 234.

MICHAEL ROGERS, Primary Examiner

U.S. Cl. X.R.
210—59